(12) United States Patent
Bourgeois (10) Patent No.: US 7,066,684 B1
(45) Date of Patent: Jun. 27, 2006

(54) SILT RESTORATION DEVICE (76) Inventor: William P. Bourgeois, 225 S. Hollywood Rd., Houma, LA (US) 70360

( * ) Notice: Subject to any disclaimer, the term of this patent is extended or adjusted under 35 U.S.C. 154(b) by 0 days.

(21) Appl. No.: 11/159,770

(22) Filed: Jun. 23, 2005

Related U.S. Application Data (60) Provisional application No. 60/583,113, filed on Jun. 24, 2004.

(51) Int. Cl.
 E02B 3/12 (2006.01)
(52) U.S. Cl. .................... 405/35; 405/34; 405/30; 405/25; 405/21; 405/15; 405/302.6
(58) Field of Classification Search ............. 405/15, 405/21, 25, 30, 31, 34, 35, 302.6
See application file for complete search history.

(56) References Cited

U.S. PATENT DOCUMENTS

| | | | | |
|---|---|---|---|---|
| 3,353,361 A | * | 11/1967 | Lloyd ........................... | 405/28 |
| 3,953,977 A | * | 5/1976 | Kikui et al. .................. | 405/27 |
| 4,022,434 A | * | 5/1977 | Moore .......................... | 405/30 |
| 5,178,489 A | * | 1/1993 | Suhayda ....................... | 405/21 |
| 5,820,295 A | * | 10/1998 | Buteaux ....................... | 405/21 |
| 6,375,387 B1 | * | 4/2002 | Gabor et al. ............. | 405/302.6 |

OTHER PUBLICATIONS

Declaration of William P. Bourgeois Concerning Experimental Use.

* cited by examiner

Primary Examiner—Frederick L. Lagman
(74) Attorney, Agent, or Firm—Jones, Walker, Waechter, Poitevent, Carrere & Denegre, L.L.P.

(57) ABSTRACT

The present invention relates to a silt restoration device comprising a vertical support member having an upper end and a lower end, wherein the upper end is connected to an upper horizontal support member with the longitudinal length of the vertical support member being substantially perpendicular to the longitudinal length of the upper horizontal support member. At least one tire will be positioned on the vertical support member below the upper horizontal support member in a substantially vertical position. The tire will have a tread surface and a center space, wherein the vertical support member will impale the tread surface of the tire at two opposed points substantially along a diameter of the tire and substantially at a midpoint of a width of the tread surface. A lower horizontal support member will be connected to the vertical support member at a point on the vertical support member located below the tire with the longitudinal length of the vertical support member being substantially perpendicular to the longitudinal length of the lower horizontal support member, the upper horizontal support member and the lower horizontal support member being substantially parallel to each other and spaced sufficiently apart to accommodate a tire therebetween. An inner tire baffle will be positioned in the center space of each tire and connected to the vertical support member. A plurality of baffles will be connected to the upper horizontal support member and the lower horizontal support member, wherein the baffles are positioned within the open spaces between the tread surface of each tire and the upper horizontal support member and the lower horizontal support member. A stabilizer plate will be attached to the lower end of the vertical support member.

20 Claims, 5 Drawing Sheets

SILT RESTORATION DEVICE

This application claims priority to U.S. Patent Application Ser. No. 60/583,113 filed on Jun. 24, 2004 which is incorporated by reference herein in its entirety

FIELD OF THE INVENTION

The present invention relates to a device designed to protect coastlines against erosion and to stimulate accretion, thereby restoring previously eroded coastlines.

BACKGROUND OF THE INVENTION

Erosion to coastlines, riverbanks, marshes and shorelines (collectively referred herein as "shoreline") is, in part, due to the movement of water across land. This type of water movement is commonly associated with waves, currents and manmade wakes. Moving water possesses an energy that is capable of displacing sedimentary material from the land. The displaced sedimentary material becomes suspended in the moving water and is deposited in another location when the speed of the moving water slows to a speed that is no longer sufficient to transport the sedimentary material. This deposition of sedimentary material is commonly referred to as accretion. The present invention seeks to reduce the erosive forces of moving water and to restore damaged coastlines by slowing the speed of moving water.

DETAILED WRITTEN DESCRIPTION

Figure 1:
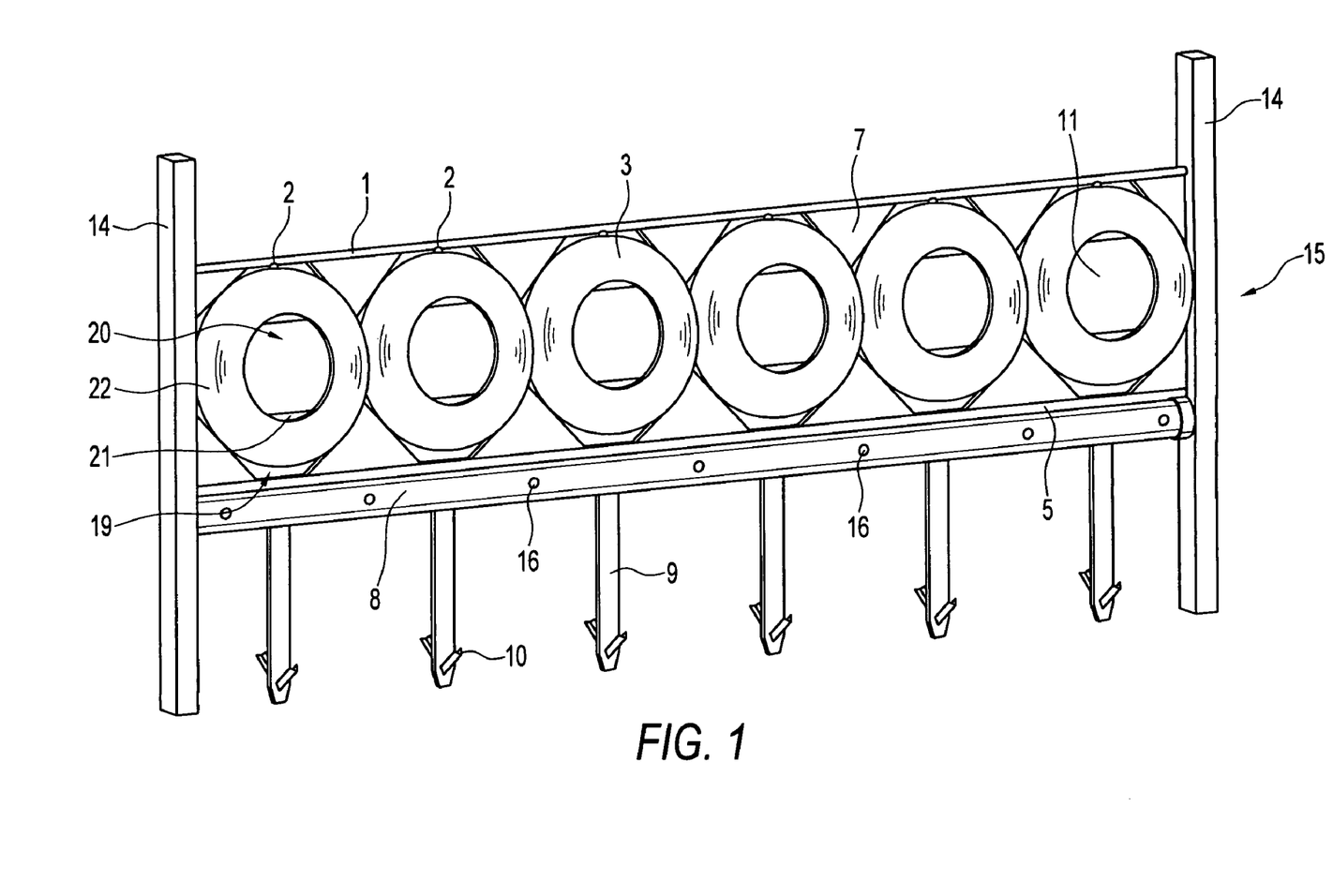
FIG. 1 is a perspective view of one embodiment of the invention.

An embodiment of the present invention is illustrated in FIG. 1 as silt restoration device 15. Silt restoration device 15 is a fence-like structure that is designed to be partially driven into soil, mud, sand, marsh-bottom or other surface commonly found within shoreline environments. As will be further described below, silt restoration device 15 will typically be positioned between a source of moving water and the area sought to be protected or restored. The area sought to be protected or restored shall hereinafter be referred to as "protected area", and shall comprise the shoreline sought to be protected as well as the area between that shoreline and the silt restoration device 15. The present invention will function as a physical barrier that will interrupt the flow of water, thereby impeding the water from flowing across and/or contacting the protected area with enough force and velocity to cause erosion.

Although silt restoration device 15 has the affect of physically impeding or disrupting the movement of water, the device is not completely impervious to water. As will be clear from the description below, there are open spaces in silt restoration device 15 that permit water to cross the device. The water passing across silt restoration device 15 will contain suspended sedimentary material. This silt laden water will become temporarily detained in the protected area between the silt restoration device 15 and the shoreline, thereby resulting in a further reduction in the velocity of the detained water. When the detained water slows to a certain velocity, gravitational forces will cause the suspended sedimentary material to settle at the bottom of the protected area, thereby resulting in accretion.

Still referring to FIG. 1, silt restoration device 15 comprises tires 3 positioned within a supporting structure. Tires 3 will be characterized by a tread surface 19, a center space 20, an inside wall 21 and opposing sidewalls 22. The tread surface 19 is positioned along the outer circumference of the tire and is that portion of a conventional tire that is designed to contact the street. The center space 20 is the hole through the center of the tire 3 and is the space designed to be occupied by a wheel or rim. The inside wall 21 is the inside of tire 3 located opposite tread surface 19 and sidewalls 22.

Tires 3 may comprise any conventional tire. The size of tires 3 may vary from one embodiment of the invention to another. In some embodiments of the invention, tires 3 will range in rim diameter from approximately 13 inches to 17 inches. In the illustrated embodiment, each tire 3 within silt restoration device 15 will be substantially the same size. The dimensions of silt restoration device 15 can be modified to accommodate the particular size of tires 3 used in the device. Used tires are a particularly good source of structure because of their wide availability and low cost. Because tires are substantially non-degradable in water, they function as durable components to silt restoration device 15 when used within a marine environment.

The configuration of tires 3 may also vary depending upon the characteristics of the marine environment in which the device is intended to be placed. The illustrated embodiment comprises a single row of tires 3 arranged in a horizontal configuration. To accommodate marine environments characterized by deeper waters, silt restoration device 15 may be configured to include two or more rows of tires 3 stacked on top of one another.

Figure 2:
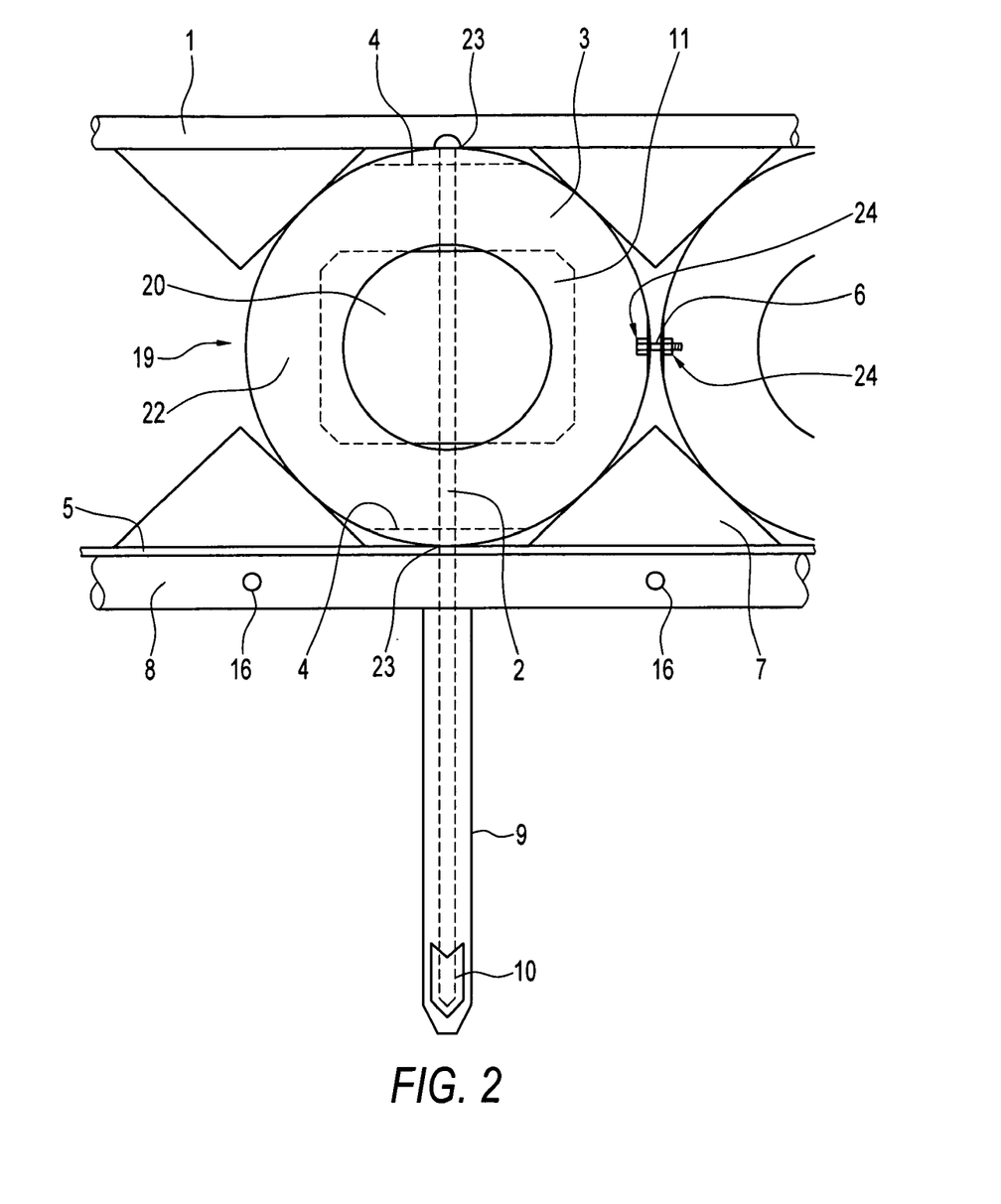
FIG. 2 is an enlarged view of the embodiment seen in FIG. 1.

FIG. 2 depicts a portion of silt restoration device 15, focusing primarily on a single tire 3 within the device. The structure supporting tires 3 will generally comprise at least one vertical support member, an upper horizontal support member and a lower horizontal support member. In the illustrated embodiment the vertical support member will be main stabilizer rod 2, the upper horizontal support member will be main support rod 1 and the lower horizontal support member will be lower support rod 5. Main stabilizer rod 2 will have an upper end and a lower end. The upper end of main stabilizer rod 2 will be connected to main support rod 1, with the longitudinal axis of main stabilizer rod 2 being positioned substantially perpendicular to the longitudinal axis of main support rod 1. In the illustrated embodiment, main stabilizer rod 2 is welded to main support rod 1, however any other conventional means of connecting main support rod 1 to main stabilizer rod 2 may be used. Main support rod 1 in the illustrated embodiment will have a diameter of approximately 1½ inches and will be comprised of a 5000 to 6000 series aluminum alloy. Main stabilizer rod 2 will have a diameter of approximately 1¼ inches and will also be comprised of a 5000 to 6000 series aluminum alloy. In an alternate embodiment of the invention main stabilizer rod 2 and main support rod 1 may instead comprise any other material suitable for functioning as structure for silt restoration device 15, including but not limited to other alloys, wood, steel, iron, PVC, cable, etc. Likewise, the material used for, and the diameters of, main support rod 1 and main stabilizer rod 2 will vary depending upon the characteristics of the particular marine environment in which the silt restoration device 15 is intended to be placed. For example, in those embodiments of the invention intended to function in a corrosive marine environment, such as salt or brackish water, a non-corrosive material or a material having a protective coating may be used for main support rod 1 and main stabilizer rod 2. In those marine environments characterized by stronger moving water forces, such as swifter currents or larger waves, main and lower support rods 1,5 will comprise a material having sufficient mechanical properties to withstand the forces of the moving water or will comprise a reinforced material suitable to withstand the forces of moving water. In either case, these components will function to strengthen the overall structure of silt restoration device 15.

Still referring to FIG. 2, tire 3 will be positioned on main stabilizer rod 2. In the illustrated embodiment, tires 3 will include two pairs of opposing holes. The first pair of holes 23 will be positioned along the vertical center axis of tire 3 with one of the holes being positioned on the top center of tire 3 and the other hole being oppositely positioned on the bottom center of tire 3. The vertically oriented holes will sometimes hereinafter be referred as the "stabilizer holes 23". The second pair of holes 24 will be positioned along the horizontal center axis of tire 3, with each of the holes 24 being positioned on an opposing side of tire 3. These horizontally oriented holes 24 will sometimes hereinafter be referred as the "bolt holes 24". Stabilizer and bolt holes 23,24 will be apertures centered between sidewalls 22 in the tread surface 19 of tire 3 so that tire 3 is centered underneath main support rod 1.

As shown in FIG. 2, tire 3 will be positioned on main stabilizer rod 2 with the longitudinal axis of main stabilizer rod 2 extending through opposing sides of tread surface 19. In positioning tire 3 on main stabilizer rod 2, the end of main stabilizer rod 2 located opposite of the end connected to main support rod 1 will be inserted through both stabilizer holes 23 in tire 3. Tire 3 will then be advanced onto main stabilizer rod 2 until the point where main support rod 1 prevents further advancement.

Still referring to FIG. 2, tires 3 will be anchored to main stabilizer rod 2 using tire anchors 4. Tire anchor 4 will be positioned on main stabilizer rod 2 at points on main stabilizer rod 2 where main stabilizer rod 2 meets the vertically positioned stabilizer holes 23 in tire 3, and will be connected to main stabilizer rod 2 using any conventional means of connection, such as welding. Tire anchors 4 will function to prevent tire 3 from backing off of main stabilizer rod 2, and will also function to prevent tire 3 from collapsing. In the illustrated embodiment, tire anchors 4 will each be comprised of a triangular plate of material measuring 4 inches×4 inches×5½ inches×⅛ inches (as shown FIG. 3a, tire anchors 4 will be the corner pieces of a rectangular sheet of material). The material of the particular described embodiment will be a 5000 to 6000 series aluminum alloy plate. Tire anchors 4 in alternate embodiments of the invention may comprise any material having any dimensions suitable for supporting tire 3 onto main stabilizer rod 2.

Referring once again to FIG. 2, lower support rod 5 will be connected to main stabilizer rod 2 at a location on main stabilizer rod 2 that is beneath tire 3. In the illustrated embodiment, lower support rod 5 will be comprised of a 5000 to 6000 series aluminum alloy material and will have measurements of 2 inches×2 inches×³⁄₁₆ inches. However, lower support rod 5 may comprise any material and have any dimensions suitable for functioning as structure within silt restoration device 15.

Recall that the above referenced FIG. 2 only depicts a portion of silt restoration device 15. FIG. 1, in contrast, illustrates a section of one embodiment of the invention, and therefore shows how the structural components of silt restoration device 15 connect when there are multiple tires 3 within the device. Turning now to FIG. 1, each main stabilizer rod 2 will attach to main support rod 1 in the same manner as discussed above. In embodiments of silt restoration device 15 containing multiple main stabilizer rods 2, lower support rod 5 will connect to each such main stabilizer rod 2 in the same perpendicular manner as suggested in FIG. 1 (although not visible in FIG. 1, the lower portion of main stabilizer rod 2 will be positioned behind stabilizer plates 9). The spacing between neighboring main stabilizer rods 2 within silt restoration device 15 will vary depending upon the size of tires 3 used in the particular embodiment of the invention. In the illustrated embodiment, tires 3 are all substantially the same size, thereby resulting in main stabilizer rods 2 being spaced an equal distance from one another.

Some embodiments of silt restoration device 15 will include a means for reducing the rotational movement of tires 3. "Rotational movement", as used herein, refers to the tendency of tires 3 to rotate about main stabilizer rod 2. This type of movement may be caused by the force of moving water exerted against silt restoration device 15. The rotational movement of tires 3 can result in unwanted gaps or openings in silt restoration device 15, thereby decreasing the ability of the device to temporarily detain silt laden water.

As shown in FIG. 2, means for reducing the rotational movement of tires 3 will include bolt assemblies 6. Bolt assemblies 6 may comprise any conventional combination of nuts, bolts and washers suitable for adjoining adjacent tires 3 within silt restoration device 15. In the illustrated embodiment, bolt assemblies 6 will comprise: one ½ inch×3 inch hot dipped galvanized bolt; two ½ inch hot dipped galvanized flat washers; two 1½ inch round schedule 40 PVC washers for corrosion protection; one ½ inch hot dipped galvanized lock washer and one ½ inch hot dipped galvanized nut. A bolt assembly 6 and two tire anchors 4 will be used to join the sides of two adjacent tires 3. The assembly configuration for adjoining adjacent sides of tires 3 will be as follows: head of bolt, flat washer, PVC washer, tire anchor 4, tire 3, adjacent tire 3, tire anchor 4, PVC washer, flat washer, lock washer, and nut. Each of the aforementioned tire anchors 4 will include a hole for the passage of bolt assembly 6 therethrough. In the above configuration, a PVC washer is positioned next to each galvanized washer to prevent corrosion between the galvanized washers and the remainder of bolt assembly 6. The bolt will be inserted through matching bolt holes 24 (the horizontally positioned holes 24 in tires 3 as discussed above) with a flat washer and PVC washer positioned on both sides of the bolt followed with a nut to hold bolt assembly 6 together. Means for reducing the rotational movement of tires 3 may also include any other means for adjoining adjacent tires 3, including without limitation, positioning a rod, rope, chain or cable horizontally through bolt holes 24 of tires 3 in the same manner as main stabilizer rod 2 is positioned through stabilizer holes 23 of tires 3 or anchoring tires 3 to any other suitable portion of silt restoration device 15.

Figure 3A:
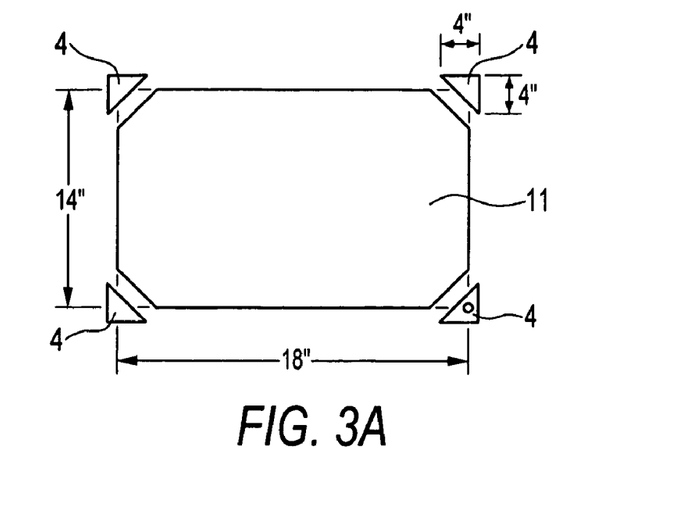
FIG. 3a illustrates one embodiment of an inner tire baffle and anchors.
Figure 3B:
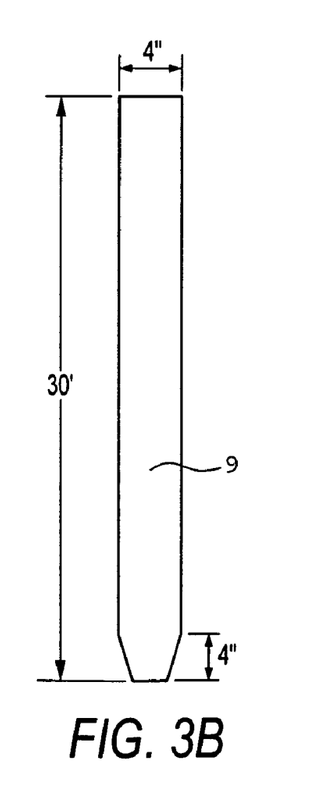
FIG. 3b illustrates one embodiment of a stabilizer plate.
Figure 3C:
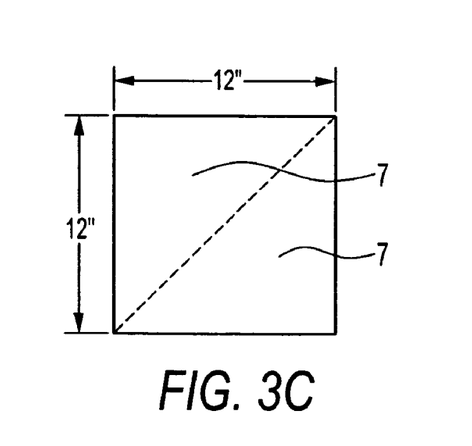
FIG. 3c illustrates one embodiment of a couple of baffles.

Silt restoration device 15 further includes baffles for purposes of impeding the flow of moving water. A baffle will comprise any material of any size and dimension suitable for sufficiently filling the center spaces 20 of tires 3 and the spaces between tires 3 and the remaining structure of silt restoration device 15. A space is sufficiently filled if that space allows the passage of moving water, but is of a sufficient size to slow or detain silt laden water in a protected area long enough to permit accretion to occur. Baffles are illustrated in FIG. 2 as outer baffles 7 and inner tire baffle 11. Outer baffles 7 will be positioned in the spaces between tire 3 and surrounding structure. In the illustrated embodiment, outer baffles 7 are connected to main support rod 1 and lower support rod 5 using conventional attachment means such as welding. Each depicted outer baffle 7 is comprised of a ⅛ inch×12 inch×12 inch×17 inch triangular shaped 5000 or 6000 series aluminum alloy plate. As shown in FIG. 3c, outer baffles 7 can be fabricated from a 12"×12" sheet of material, however the size of outer baffles 7 will vary depending upon the size of tires 3 used to construct silt restoration device 15. In addition to aluminum alloy, outer baffles 7 may comprise any other material suitable for impeding the movement of water across silt restoration device 15. Further, outer baffles 7 need not be a solid plate as depicted in FIG. 1, but instead may be porous, so long as the movement of water is sufficiently slowed to reduce its erosive force and/or to stimulate accretion.

Inner tire baffle 11 will be positioned within the center space 20 of a tire 3. Inner tire baffle 11 will be connected to main stabilizer rod 2 as shown in FIG. 2 using any conventional means of connecting the same. In one embodiment of the invention, inner tire baffle 11 will fill at least 75% of the center space 20 of a tire 3. In another embodiment of the invention, inner tire baffle 11 will fill at least 95% of the center space 20 of a tire 3. In yet another embodiment, inner tire baffle 11 will fill 75% to 95% of the center space 20 of a tire 3. In other embodiments, any percentage of center space 20 from 50% to 95% could be filled. The width of inner tire baffle 11 may also be varied to limit the rotational movement of a tire 3 about main stabilizer rod 2. For example, inner tire baffle 11 could have dimensions sufficient to span the horizontal inner width of a tire 3, thereby reducing the rotational movement of tire 3 about main stabilizer rod 2. In addition, widening inner tire baffle 11 to a width that is substantially equal to the inner width of tire 3 will cause inner tire baffle 11 to function as an anchoring means in anchoring tire 3 to inner stabilizer rod 2. In the embodiment illustrated in FIG. 2, inner tire baffle 11 is comprised of an 18 inch×"z" (where "z" is 1 inch less than the inner diameter of tire 3 used)×⅛ inch 5000 or 6000 series aluminum alloy plate with corners. The size of the tire baffle 11 may vary in other embodiments of the invention. FIG. 3a provides a close-up view of the corners removed from inner tire baffle 11. As with outer baffles 7, inner baffles 11 may be porous in some embodiments of the invention.

Turning again to FIG. 2, scouring buffer 8 is positioned beneath lower support rod 5. Scouring buffer 8 includes holes sufficiently sized to accommodate main stabilizer rod 2. In assembling silt restoration device 15, the holes of scouring buffer 8 will slide over main stabilizer rod 2, thereby permitting scouring buffer 8 to advance against lower support rod 5. The dimensions of scouring buffer 8 will vary depending upon the dimensions of a particular silt restoration device. In the illustrated embodiment, scouring buffer 8 will comprise a 6 inch×18 feet piece of schedule 40 PVC pipe with 1½ inch scouring holes 16. The ends of scouring buffer 8 in the illustrated embodiment can be capped. The scouring holes 16 provide access points for entry of water into scouring buffer 8 when a silt restoration device is partially submerged in a marine environment. The water entering scouring holes 16 weights the silt restoration device down, thereby preventing the device from floating as well as preventing water from flowing underneath the silt restoration device.

Silt restoration device 15 will include a means for stabilizing the portion of main stabilizer rod 2 that is designed to be positioned beneath the ground. One example of such means is illustrated in FIG. 2 as stabilizer plate 9. As shown, stabilizer plate 9 will be connected to main stabilizer rod 2 at a point on main stabilizer rod 2 beneath scouring buffer 8. Stabilizer plate 9 may be positioned on main stabilizer rod 2 with its plane facing the same direction as the plane of silt restoration device 15 occupied by main support rod 1 and lower support rod 5. In the particular embodiment illustrated in FIG. 2, stabilizer plate 9 measures 4 inches×30 inches×⅛ inches and is comprised of a 5000 or 6000 series aluminum alloy plate. As shown in FIG. 3b, the end of one embodiment of stabilizer plate 9 is tapered. The tapered end enhances the ability stabilizer plate 9 to penetrate the ground.

As depicted in FIGS. 1 and 2, anchors 10 will be attached to the bottom of stabilizer plates 9. Anchors 10 will function as barbs in preventing silt restoration device 15 from backing out of the ground. Instead of attaching anchors 10 to stabilizer plate 9, anchors 10 may instead be attached to main stabilizer rod 2. In the illustrated embodiment, anchors 10 will measure 2 inches×2 inches×6 inches×⅛ inch and will be comprised of 5000 or 6000 series aluminum alloy.

Figure 4:
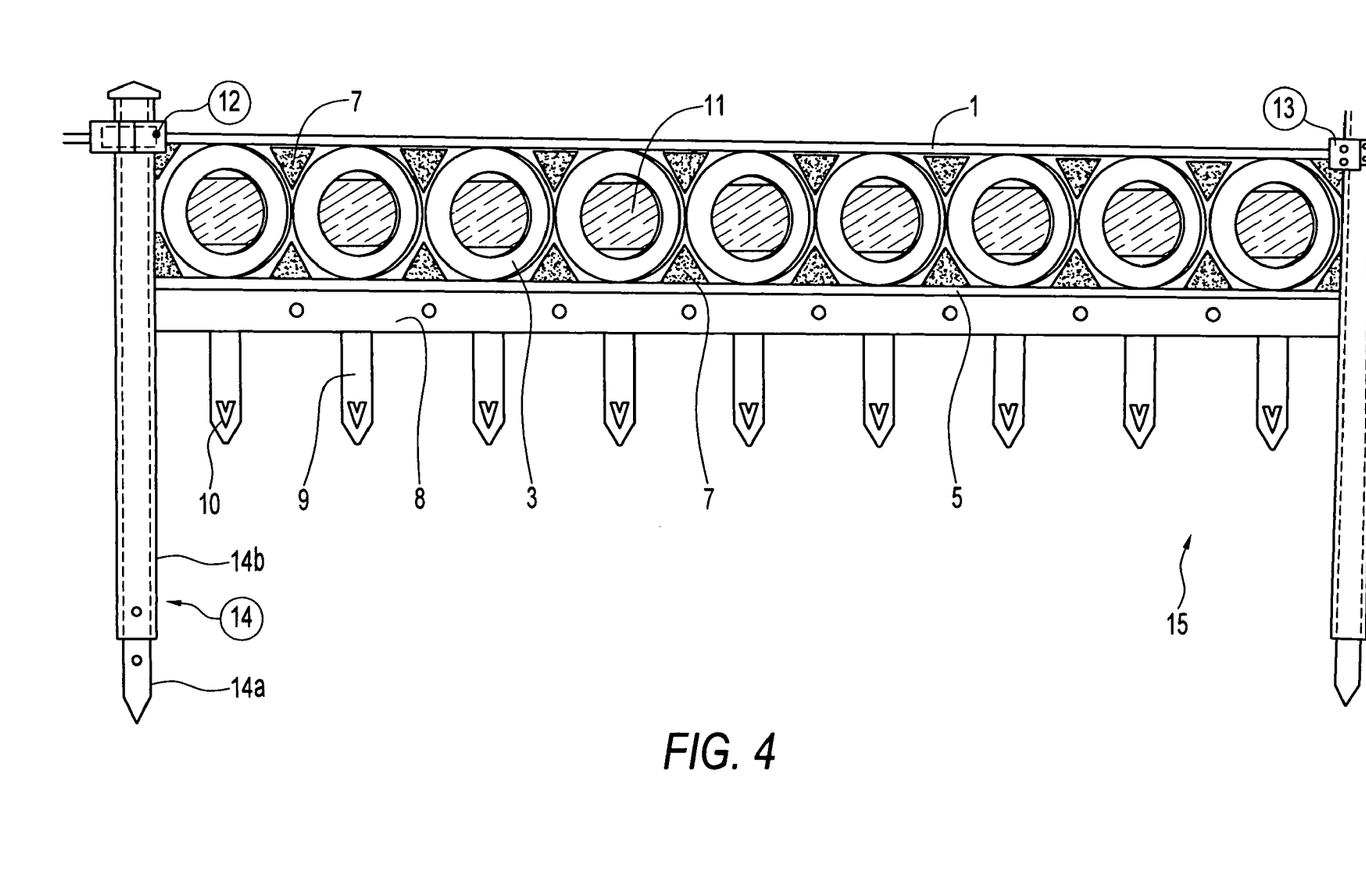
FIG. 4 is another view of the embodiment seen in FIG. 1.

As shown in FIG. 4, silt restoration device 15 includes a piling 14 on both sides of the device. Pilings 14 may be comprised of any material suitable for laterally supporting silt restoration device 15 within a marine environment. In one embodiment, each piling 14 will measure 4 inches×4 inches×16 feet and will be comprised of pressure treated pine piling 14a (2.5 retention) inserted within a 6 inches×6 inches×⅜ inch×14 feet polyethylene hollow piling 14b. The function of the polyethylene piling 14b is to minimize the corrosive effects of a marine environment (particularly certain types of marine wildlife) on the treated pine piling 14a. Although the embodiment of FIG. 4 illustrates a hollow polyethylene piling 14b positioned over the wood piling 14a, alternate embodiments could include other methods of enclosing the wood in polyethylene or another protective material covering the wood.

In the illustrated embodiment of the invention, each piling 14 will be capped on its upper end. The length of pilings 14 will vary depending upon the ground characteristics and depth of water within a particular marine environment. The ends of main support rods 1 will connect to pilings 14 using any conventional connection means. In one embodiment of the invention, main support rod 1 will connect to pilings 14 using connecting brackets 13 measuring 4 inches×5 inches× ½ inches, comprised of 5000 or 6000 series aluminum alloy plate, and having four 9/16" holes drilled on one end for connection purposes.

To install silt restoration device 15, pilings 14 will first be driven into the ground using any conventional means for accomplishing the same. The distance between consecutive pilings 14 will depend upon the actual width of silt restoration device 15 (recall that the width of silt restoration device 15 will vary depending upon such factors as the size of tires 3 used, the number of tires 3 used, and the configuration of the device). Next, a piling mounting bracket 12 will be bolted to each piling at the appropriate height necessary for the particular installation. Silt restoration device 15 will then be positioned between the two pilings 14. The silt restoration device 15 will then be driven to a depth where scouring buffer 8 is positioned into the soft mud. In one embodiment of the invention, silt restoration device 15 will be driven to a depth wherein the water level does not exceed 50% of the inner tire baffle 11 at high tide. In another embodiment of the invention, silt restoration device 15 will be driven to a depth wherein the water level does not exceed 75% of the inner tire baffle 11 at high tide. In yet another embodiment of the invention, silt restoration device will be driven to a depth wherein the water level exceeds 75% of the inner tire baffle 11 at high tide. The silt restoration device 15 is then bolted to the pilings 14 using the connectors 13 on each end of the device and the piling mounting brackets 12. The bolt assembly consists of utilizing hot dipped galvanized bolts, flat washers and nuts as well as PVC washers in the same manner as attaching adjacent tires 3 with bolt assemblies 6.

Figure 5:
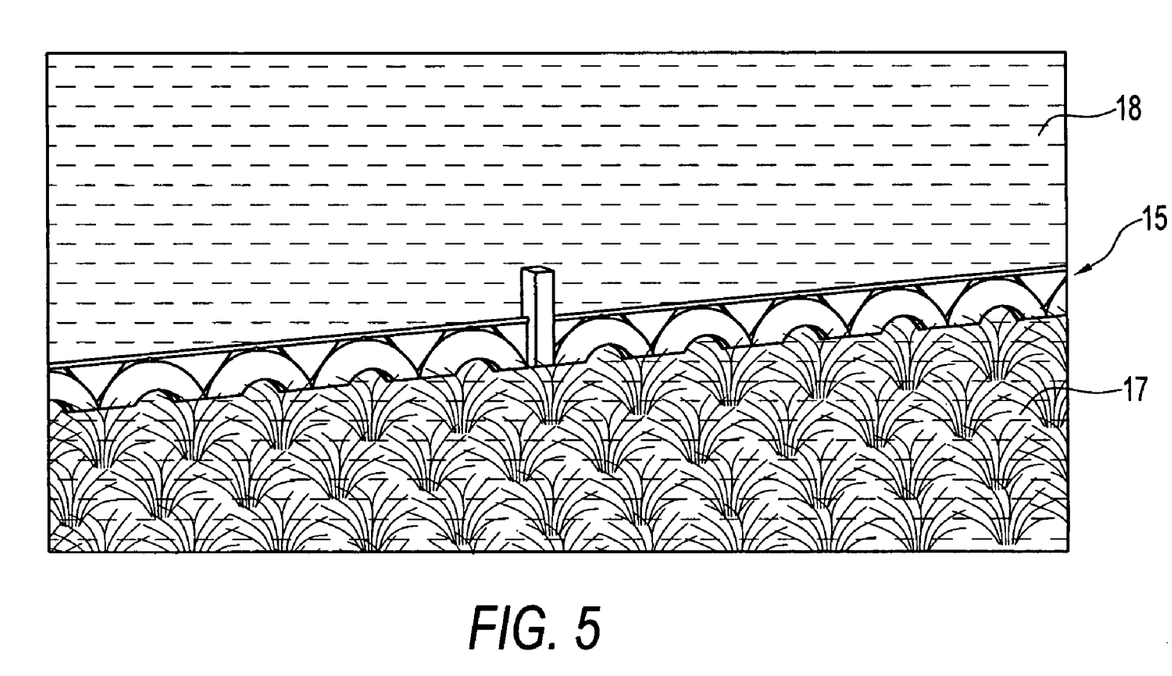
FIG. 5 is an illustration for an exemplary placement of one embodiment of the invention within a marine environment.

FIG. 5 is an exemplary location for silt restoration device 15 within a marine environment. As depicted in FIG. 5, the silt restoration device 15 will typically be positioned between a source of moving water 18 and the protected area 17 such as marsh or shoreline. As moving water approaches the protected area 17, the velocity of the moving water 18 will be interrupted and slowed by silt restoration device 15. The angle at which silt restoration device is positioned in relation to the prevailing directional movement of the water may vary from one embodiment of the invention to the next. For example, in one embodiment of the invention, silt restoration device 15 will be positioned perpendicular to the directional movement of the water. In another embodiment, silt restoration device 15 will be positioned parallel to the protected area, irrespective of the directional movement of the water.

Multiple silt restoration devices 15 may be positioned together to form a common structure along the distance of a protected area. The angle at which each silt restoration device makes with its adjacent silt restoration device 15 may be altered to accommodate the natural curves of the protected area.

One embodiment of the present invention relates to a silt restoration device comprising a vertical support member having an upper end and a lower end, wherein the upper end is connected to an upper horizontal support member with the longitudinal length of the vertical support member being substantially perpendicular to the longitudinal length of the upper horizontal support member. At least one tire will be positioned on the vertical support member below the upper horizontal support member in a substantially vertical position. The tire will have a tread surface and a center space, wherein the vertical support member will impale the tread surface of the tire at two opposed points substantially along a diameter of the tire and substantially at a midpoint of a width of the tread surface. A lower horizontal support member will be connected to the vertical support member at a point on the vertical support member located below the tire with the longitudinal length of the vertical support member being substantially perpendicular to the longitudinal length of the lower horizontal support member, the upper horizontal support member and the lower horizontal support member being substantially parallel to each other and spaced sufficiently apart to accommodate a tire therebetween. An inner tire baffle will be positioned in the center space of each tire and connected to the vertical support member. A plurality of baffles will be connected to the upper horizontal support member and the lower horizontal support member, wherein the baffles are positioned within the open spaces between the tread surface of each tire and the upper horizontal support member and the lower horizontal support member. A stabilizer plate will be attached to the lower end of the vertical support member.

Another embodiment of the invention will comprise a plurality of vertical support members, each having an upper end and a lower end, wherein the upper end of each vertical support member is connected to a common upper horizontal support member with the longitudinal lengths of each vertical support member being substantially perpendicular to the longitudinal length of the upper horizontal support member, and each vertical support member being substantially parallel to one another and spaced sufficiently along the horizontal length of the upper horizontal support member to allow at least one tire to be vertically positioned on each vertical support member. At least one tire will be positioned on each vertical support member below the upper horizontal support member in a substantially vertical position, each tire having a tread surface and a center space, wherein each vertical support member impales the tread surface of the tire at two opposed points substantially along a diameter of the tire and substantially at a midpoint of a width of the tread surface. The herein described embodiment will further comprise a means for reducing lateral movement of the tires. A lower horizontal support member will be connected to each vertical support member at a point on each vertical support member located below the tire with the longitudinal lengths of each vertical support member being substantially perpendicular to the longitudinal length of the lower horizontal support member, the upper horizontal support member and the lower horizontal support member being substantially parallel to each other and spaced sufficiently apart to accommodate at tire therebetween. An inner tire baffle will be positioned in the center space of the tire and connected to the vertical support member. A plurality of baffles will be connected to the upper horizontal support member and the lower horizontal support member, wherein the baffles will be positioned within the open spaces between the tread surface of the tire and the upper horizontal support member and the lower horizontal support member. A stabilizer plate will be attached to the lower end of said vertical support member.

Although the present invention has been described in terms of specific embodiments, those skilled in the art will recognize many obvious variations and modification.

I claim:

1. An apparatus, comprising:
   a. at least one vertical support member having an upper end and a lower end, wherein said upper end is connected to an upper horizontal support member with the longitudinal length of said vertical support member being substantially perpendicular to the longitudinal length of said upper horizontal support member;
   b. at least one tire positioned on said vertical support member below said upper horizontal support member in a substantially vertical position, said tire having a tread surface and a center space, wherein said vertical support member impales said tread surface of said tire at two opposed points substantially along a diameter of said tire and substantially at a midpoint of a width of said tread surface;
   c. a lower horizontal support member connected to said vertical support member at a point on said vertical support member located below said tire with the longitudinal length of said vertical support member being substantially perpendicular to the longitudinal length of said lower horizontal support member, said upper horizontal support member and said lower horizontal support member being substantially parallel to each other and spaced sufficiently apart to accommodate said tire therebetween;

d. an inner tire baffle positioned in the center space of said tire and connected to said vertical support member;

e. a plurality of baffles connected to said upper horizontal support member and said lower horizontal support member, wherein said baffles are positioned within the open spaces between said tread surface of said tire and said upper horizontal support member and said lower horizontal support member; and f. a stabilizer plate attached to said lower end of said vertical support member.

2. The apparatus of claim 1 further comprising at least one tire anchor connected to said vertical support member and positioned substantially against an inner wall of said tire.

3. The apparatus of claim 1, wherein said inner tire baffle is sufficiently sized to block at least 75% of said center space of said tire.

4. The apparatus of claim 1, further comprising a scouring buffer positioned on said vertical support member and located below and substantially parallel to said lower horizontal support member, said scouring buffer having a plurality of apertures therein.

5. The apparatus of claim 1 wherein each said baffle has at least one hole therethrough.

6. The apparatus of claim 1, further comprising a connecting bracket affixed to both longitudinal sides of said upper horizontal support member.

7. The apparatus of claim 6, further comprising a piling positioned on both longitudinal sides of said upper horizontal support member, each of said pilings having a piling bracket for purposes of connecting to said connector bracket.

8. The apparatus of claim 1, further comprising an anchor positioned on said lower end of said vertical support member.

9. The apparatus of claim 3, wherein said inner tire baffle is sufficiently sized so that the sides of said inner tire baffle substantially span the inside width of said tire.

10. The apparatus of claim 1, further comprising more than one said vertical support member with each said vertical support member having at least one said tire positioned thereon with adjacent sides of neighboring said tires being linked together.

11. An apparatus, comprising:

a. a plurality of vertical support members, each having an upper end and a lower end, wherein said upper end of each said vertical support member is connected to a common upper horizontal support member with the longitudinal lengths of each of said vertical support members being substantially perpendicular to the longitudinal length of said upper horizontal support member, and said vertical support members being substantially parallel to one another and spaced sufficiently along the horizontal length of said upper horizontal support member to allow at least one tire to be vertically positioned on each of said vertical support members;

b. at least one tire positioned on each of said vertical support members below said upper horizontal support member in a substantially vertical position, each said tire having a tread surface and a center space, wherein each said vertical support member impales said tread surface of said tire at two opposed points substantially along a diameter of said tire and substantially at a midpoint of a width of said tread surface;

c. a means for reducing lateral movement of said tires;

d. a lower horizontal support member connected to each said vertical support member at a point on said vertical support members located below said tire with the longitudinal lengths of each said vertical support members being substantially perpendicular to the longitudinal length of said lower horizontal support member, said upper horizontal support member and said lower horizontal support member being substantially parallel to each other and spaced sufficiently apart to accommodate said tire therebetween;

e. an inner tire baffle positioned in the center space of each said tire and connected to said respective vertical support member;

f. a plurality of baffles connected to said upper horizontal support member and said lower horizontal support member, wherein said baffles are positioned within the open spaces between said tread surface of said tire and said upper horizontal support member and said lower horizontal support member; and g. a stabilizer plate attached to said lower end of said vertical support member.

12. The apparatus of claim 11 further comprising at least one tire anchor connected to each of said vertical support members and positioned substantially against an inner wall of each of said tires.

13. The apparatus of claim 11 wherein said means for reducing lateral movement of said tires will comprise a bolt assembly linking adjacent sides of said neighboring tires.

14. The apparatus of claim 11 wherein each of said inner tire baffle is sufficiently sized to block at least 75% of said center space of each of said tires.

15. The apparatus of claim 11 further comprising a scouring buffer positioned on said vertical support members and located below and substantially parallel to said lower horizontal support member, said scouring buffer having a plurality of holes therein.

16. The apparatus of claim 11 further comprising a connecting bracket affixed to both longitudinal sides of said upper horizontal support.

17. The apparatus of claim 16, further comprising a piling positioned on both longitudinal sides of said upper horizontal support member, each of said pilings having a piling bracket for purposes of connecting to said connector bracket.

18. A method of using a silt restoration device for reducing the erosive forces of moving water and for stimulating accretion wherein the silt restoration device comprises a fence-like structure flanked on both sides by a piling and having a row of tires positioned between an upper horizontal support member and a lower horizontal support wherein said tires are impaled upon multiple vertical support members, said tires being characterized by opposing sidewalls, each said vertical support members also having a stabilizer plate positioned at its lower end, and a scouring buffer positioned below and parallel to said lower horizontal support member, comprising the steps of:

a. finding a location for placement of said silt restoration device between moving water and a protected area;

b. driving said pilings into the ground at said location using any conventional means for accomplishing the same, wherein said pilings are sufficiently spaced to accommodate the width of said silt restoration device;

c. positioning said silt restoration device between said pilings and driving said lower end of said vertical support members to a point where said scouring buffer is substantially positioned in the mud; and d. affixing said silt restoration device to said pilings.

19. The method of claim 18 wherein the longitudinal length of said silt restoration device is positioned substantially parallel to said protected area.

20. The method of claim 18 wherein said sidewalls of said tires face a direction that is substantially perpendicular to the directional movement of the moving water.

* * * * *